(No Model.)

H. P. PRATT.
ELECTRIC PLASTER.

No. 391,720. Patented Oct. 23, 1888.

Witnesses:
C. E. Gaylord.
J. H. Dyrenforth.

Inventor:
Harry P. Pratt,
By Dyrenforth & Dyrenforth,
Attys.

UNITED STATES PATENT OFFICE.

HARRY P. PRATT, OF CHICAGO, ILLINOIS, ASSIGNOR TO THE PRATT ELECTRO THERAPEUTIC SUPPLY COMPANY, OF SAME PLACE.

ELECTRIC PLASTER.

SPECIFICATION forming part of Letters Patent No. 391,720, dated October 23, 1888.

Application filed July 5, 1888. Serial No. 279,051. (No model.)

*To all whom it may concern:*

Be it known that I, HARRY P. PRATT, a citizen of the United States, residing at Chicago, in the county of Cook and State of Illinois, have invented a new and useful Improvement in Electric Plasters, of which the following is a specification.

The object of my invention is to provide means whereby an electric generator and the electrodes connected with the opposite poles thereof may be supported directly in contact with the body of the wearer, and at any part of the same which it shall be desired to subject to the action of the current generated by the appliance.

To this end my invention consists in a plaster which may be formed with a medicinal substance provided with an electric generator and one or more electrodes adapted to be connected with the generator, whereby the adhesive quality of the plaster serves to support the generator and electrode or electrodes directly on a part of the body of the wearer to which it shall be caused to adhere.

My invention further consists in the more specific construction of my device, and in details of the construction and combinations of parts.

Figure 1:
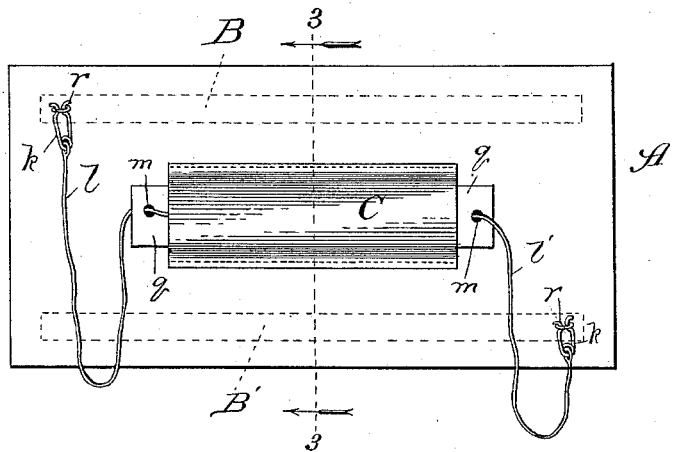
Figure 2:
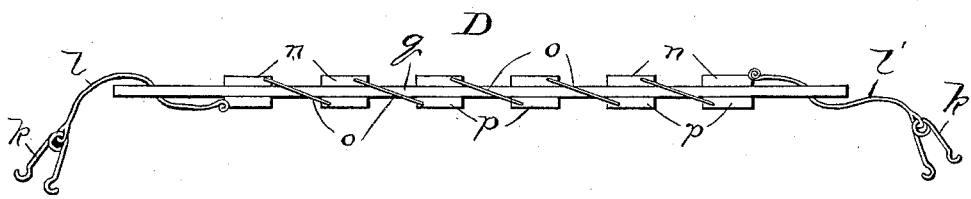
Figure 3:
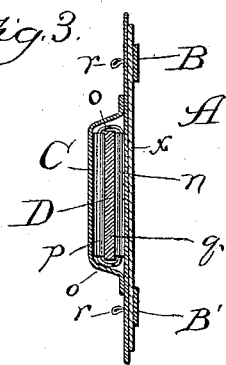

In the drawings, Figure 1 shows the rear side of the plaster provided with a battery and conductors leading from the poles and connected with electrodes, shown by dotted lines on the opposite adhesive side of the plaster. Fig. 2 is a top view of the battery, showing its construction; and Fig. 3 a section taken on the line 3 3 of Fig. 1 and viewed in the direction of the arrows.

A is a piece of fabric or other material (such as chamois-skin) suitable for my purpose, coated on one surface with an adhesive substance, $x$, which may or may not be medicated.

B and B' are metallic plates, of any suitable shape, forming electrodes having eyes $r$ on their surfaces applied to the adhesive side of the plaster, the eyes extending through the material A beyond the non-adhesive surface thereof, which is provided with a slip or pocket, C, formed, preferably, by securing the opposite longitudinal edges of a piece of fabric or other suitable material, by preference moisture-proof, upon the back of the plaster, leaving the ends of the pocket open.

D is a form of battery suitable for my purpose, and comprising a strip of absorbent material, $q$, such as felt, preferably longer than the pocket C, and having secured to one side a series of zinc plates or negative elements, $n$, and to the opposite side a series of copper plates or positive elements, $p$, the elements, except the copper at one end and the zinc at the opposite end, being connected in pairs, for intensity, diagonally across the strip C, as shown, by copper wires $o$.

The pocket C is provided to receive and support the battery, which is slipped into it from one end, the ends of the strip $q$ extending beyond the extremities of the pocket and being provided with apertures $m$.

Conductors $l$ and $l'$ connect the plate $p$ at one end of the battery and the plate $n$ at the opposite end thereof, respectively, with the electrodes B and B' at the eyes $r$ thereon, metallic clamps $k$ being provided at the ends of the conductors to permit ready connection of the latter with the eyes $r$, and as ready disconnection therefrom, the clamps when thus connected affording perfect contacts. The conductors extend from the poles of the battery to the electrodes through the apertures $m$, whereby the battery is fastened to the plaster.

To remove the battery, as for saturating the strip $q$ with the exciting-liquid, (which may be vinegar or other suitable acid,) the clamps $k$ on the conductors are disconnected from the eyes $r$ on the electrodes, which permits the battery to be withdrawn from either end of the pocket C, and it is readily reinserted, when the conductors are again connected to the eyes on the electrodes.

While I prefer to have the generator and electrodes on opposite surfaces of the plaster A, as described, they may both be on the adhesive side without departing from my invention; and it is also within my invention to have the plaster provided as a means for supporting only the generator, or the generator and one electrode, in case it should be desirable to apply the electrodes or one of them to a part of the body not within the area of the plaster.

What I claim as new, and desire to secure by Letters Patent, is—

1. In combination, an adhesive plaster having upon it an electric generator and one or more electrodes connected with the generator, substantially as described.

2. In combination, an adhesive plaster, A, having electrodes B and B' on the surface provided with the adhesive substance, and a generator, D, supported on the opposite surface of the plaster and having its poles connected with the electrodes, substantially as described.

3. In combination, an adhesive plaster, A, having on its adhesive surface electrodes B and B', provided with eyes r extending through the plaster, and a generator, D, supported on the opposite surface of the plaster and having its poles connected with the electrodes at the eyes r, substantially as described.

4. In combination, an adhesive plaster, A, having electrodes B and B' on the surface provided with the adhesive substance, a pocket on the opposite surface of the plaster, and a battery, D, in the pocket and having its poles connected with the electrodes, substantially as described.

5. In combination, an adhesive plaster, A, having electrodes B and B' on its adhesive surface, a battery, D, removably supported on the opposite surface of the plaster, and comprising a strip of absorbent material, q, having positive and negative elements p and n secured, respectively, on its opposite sides, and having pairs thereof connected across the strip q, and conductors l and l', connecting opposite poles of the battery with the electrodes, substantially as described.

6. In combination, an adhesive plaster, A, having on its adhesive surface electrodes B and B', provided with eyes r extending through the plaster, a pocket, C, open at opposite ends on the opposite surface of the plaster, a battery, D, in the pocket, comprising a strip of absorbent material, q, having positive and negative elements p and n secured, respectively, on its opposite sides, and having pairs thereof connected across the strip q and provided toward opposite ends with apertures m, and conductors l and l', connecting opposite poles of the battery with the eyes r on the electrodes and extending through the apertures m, substantially as described.

HARRY P. PRATT.

In presence of—
J. W. DYRENFORTH,
W. H. DYRENFORTH.